(12) United States Patent
De La Rosa

(10) Patent No.: US 6,328,462 B1
(45) Date of Patent: Dec. 11, 2001

(54) LIGHT MOUNTING ASSEMBLY

(76) Inventor: Tony De La Rosa, 887 Centennial Dr., Goodland, KS (US) 67735

( * ) Notice: Subject to any disclaimer, the term of this patent is extended or adjusted under 35 U.S.C. 154(b) by 0 days.

(21) Appl. No.: 09/616,930

(22) Filed: Jul. 14, 2000

(51) Int. Cl.[7] .............................. B60Q 1/26; F21V 21/108
(52) U.S. Cl. ........................ 362/485; 362/217; 362/432; 362/494; 362/549
(58) Field of Search ................................... 362/217, 432, 362/485, 494, 543, 548, 549

(56) References Cited

U.S. PATENT DOCUMENTS

| | | | |
|---|---|---|---|
| D. 344,886 | 3/1994 | Sachs | D8/373 |
| 2,024,858 | 12/1935 | Highfill | 362/485 |
| 2,586,643 | 2/1952 | Garlow | 362/549 |
| 2,693,589 | 11/1954 | Hopkins | 362/494 |
| 3,967,275 | 6/1976 | Wagman | 343/713 |
| 4,001,831 | 1/1977 | Harvey | 343/715 |
| 4,249,182 | 2/1981 | Rupley | 343/715 |
| 4,475,100 | 10/1984 | Duh | 362/494 |
| 5,025,352 | 6/1991 | Brown | 362/485 |
| 5,299,773 | 4/1994 | Bertrand | 248/514 |
| 5,984,496 | 11/1999 | Malcomson | 362/494 |

FOREIGN PATENT DOCUMENTS

885059-A  8/1953  (DE) ................................... 362/485

*Primary Examiner*—Alan Cariaso

(57) ABSTRACT

A light mounting assembly for holding a light on a semi-truck. The light mounting assembly includes at least one elongate member. The elongate member has a first end and a second end. The elongate member has a generally planar top and bottom side. The elongate member has an opening therein. The opening is generally adjacent to the first end. The elongate member has a protruding member integrally coupled thereto. The protruding member is located on the top side and positioned generally adjacent to the second end. The protruding member has a top surface having a well extending therein. The bottom side of the elongate member has a hole therein. The hole extends into the well. A fastening means fastens the elongate member to the mirror of a semi-truck. A light is elongate and has a first end and a second end. The first end is removably mounted in the protruding member. The light is operationally coupled to a power supply.

5 Claims, 3 Drawing Sheets

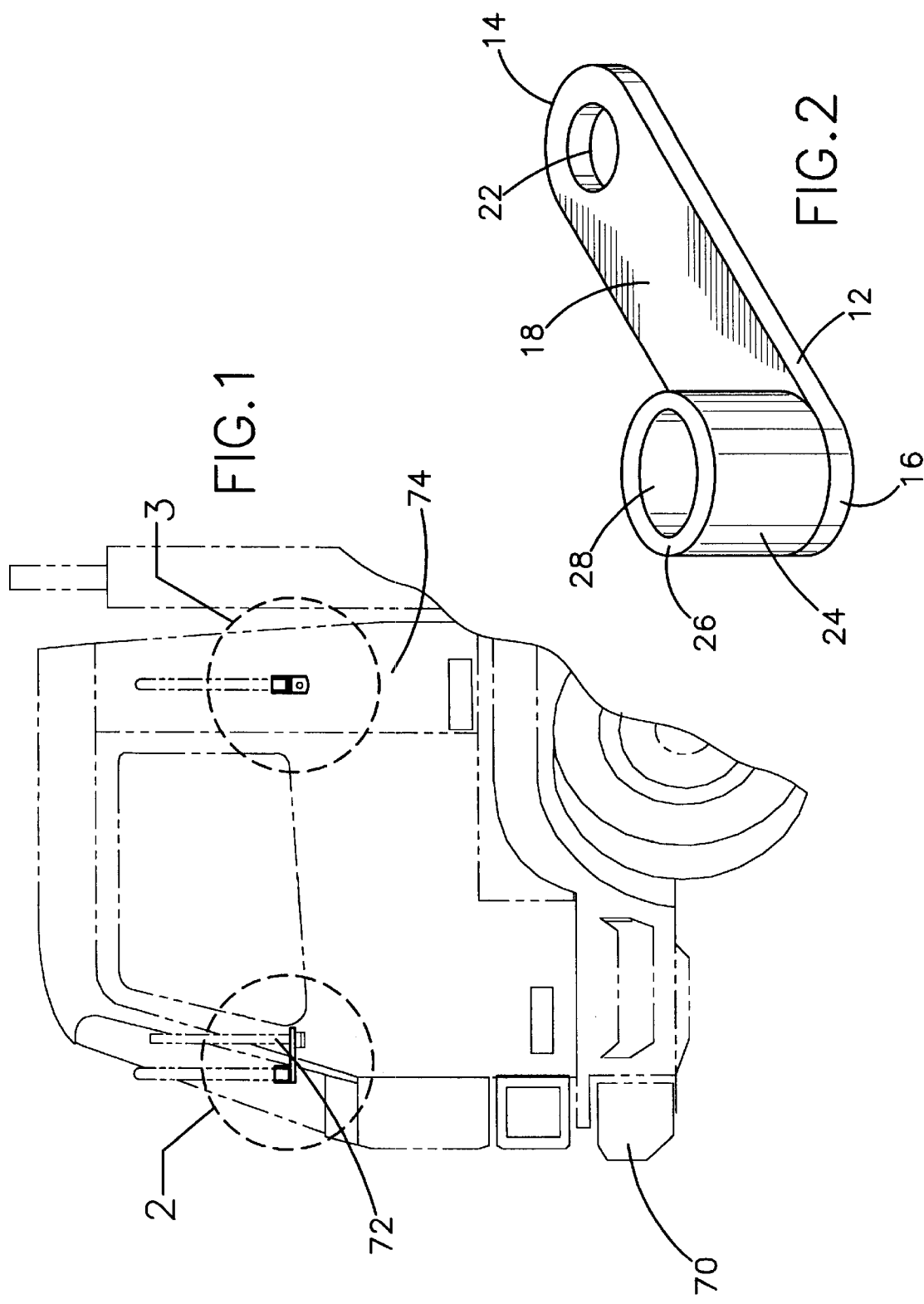

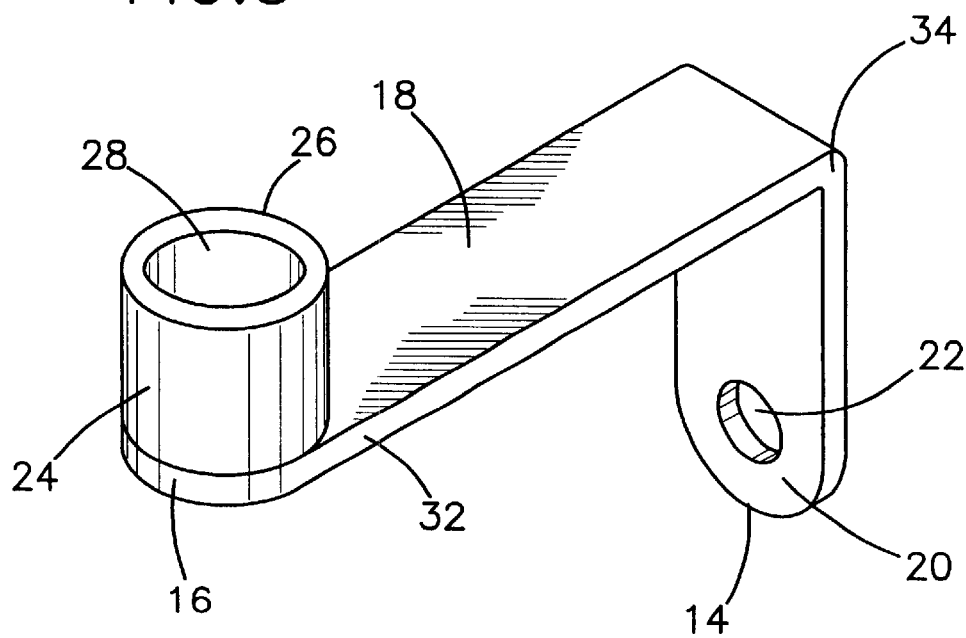
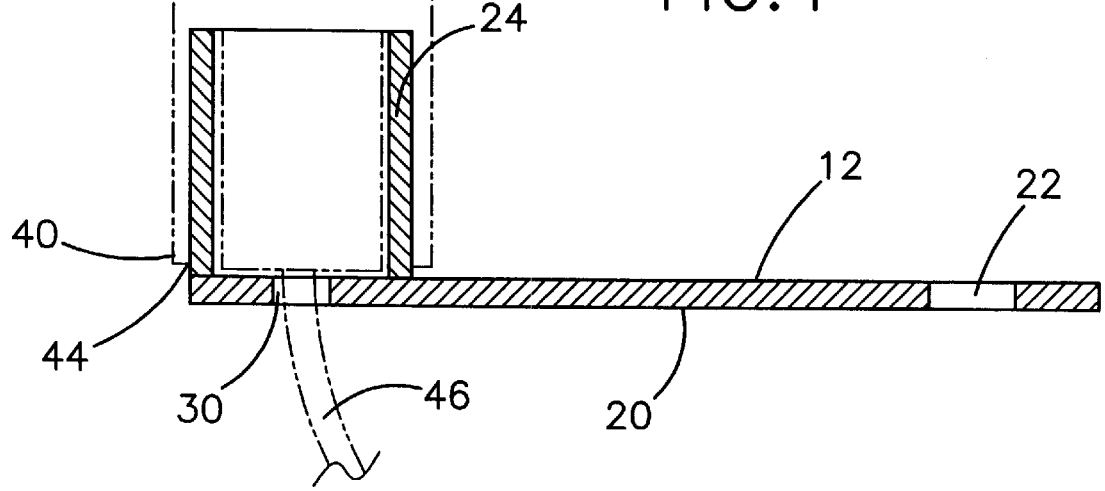

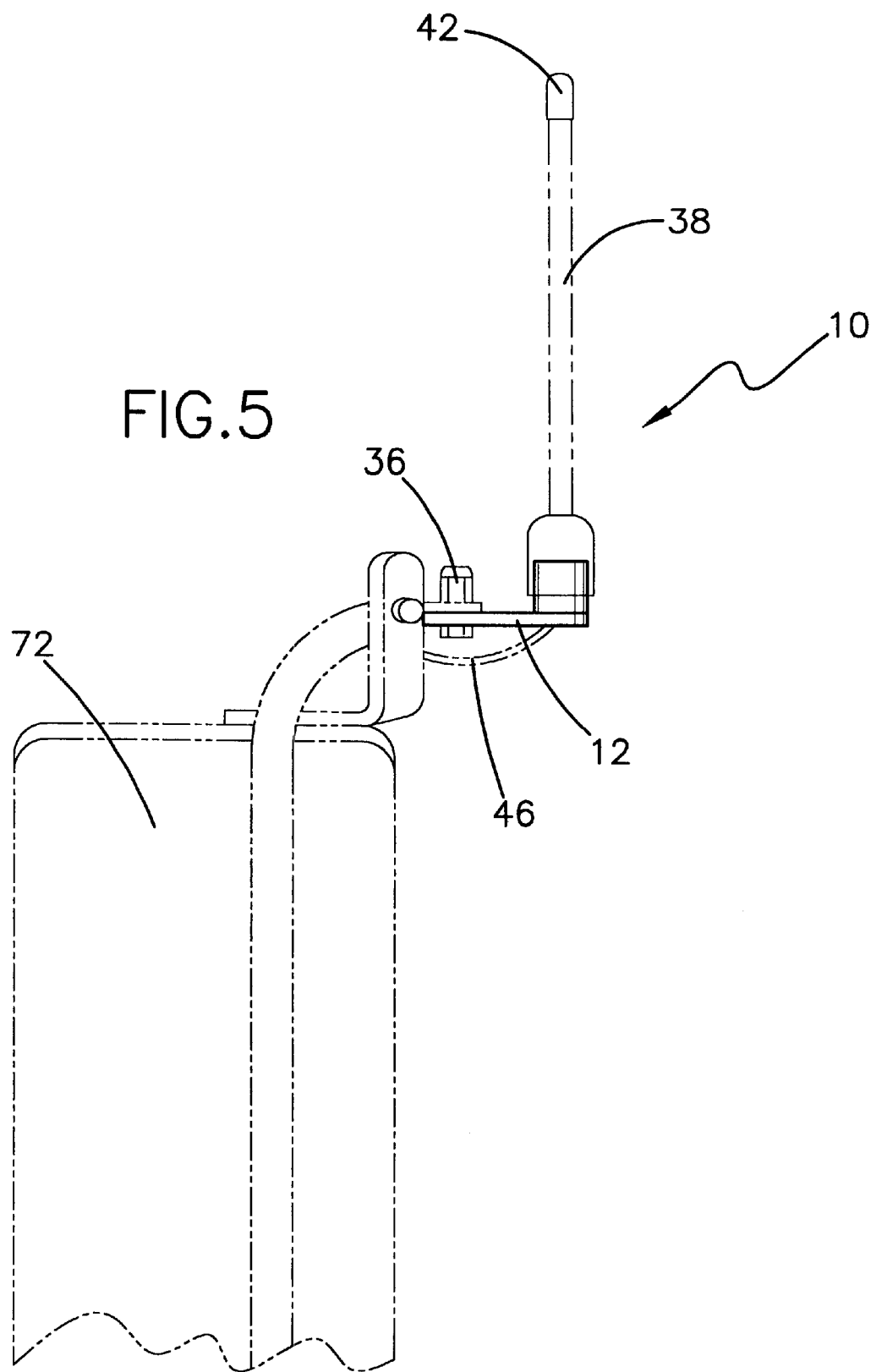

LIGHT MOUNTING ASSEMBLY

BACKGROUND OF THE INVENTION

1. Field of the Invention

The present invention relates to light mountings and more particularly pertains to a new light mounting assembly for holding a light on a semi-truck.

2. Description of the Prior Art

The use of light mountings is known in the prior art. More specifically, light mountings heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,299,773; U.S. Pat. No. Des 344,886; U.S. Pat. Nos. 4,475,100; 4,001,831; 4,249,182; and 3,967,275.

While these devices fulfill their respective, particular objectives and requirements, the aforementioned patents do not disclose a new light mounting assembly. The inventive device includes at least one elongate member. The elongate member has a first end and a second end. The elongate member has a generally planar top and bottom side. The elongate member has an opening therein. The opening is generally adjacent to the first end. The elongate member has a protruding member integrally coupled thereto. The protruding member is located on the top side and positioned generally adjacent to the second end. The protruding member has a top surface having a well extending therein. The bottom side of the elongate member has a hole therein. The hole extends into the well. A fastening means fastens the elongate member to the mirror of a semi-truck. A light is elongate and has a first end and a second end. The first end is removably mounted in the protruding member. The light is operationally coupled to a power supply.

In these respects, the light mounting assembly according to the present invention substantially departs from the conventional concepts and designs of the prior art, and in so doing provides an apparatus primarily developed for the purpose of holding a light on a semi-truck.

SUMMARY OF THE INVENTION

In view of the foregoing disadvantages inherent in the known types of light mountings now present in the prior art, the present invention provides a new light mounting assembly construction wherein the same can be utilized for holding a light on a semi-truck.

The general purpose of the present invention, which will be described subsequently in greater detail, is to provide a new light mounting assembly apparatus and method which has many of the advantages of the light mountings mentioned heretofore and many novel features that result in a new light mounting assembly which is not anticipated, rendered obvious, suggested, or even implied by any of the prior art light mountings, either alone or in any combination thereof.

To attain this, the present invention generally comprises at least one elongate member. The elongate member has a first end and a second end. The elongate member has a generally planar top and bottom side. The elongate member has an opening therein. The opening is generally adjacent to the first end. The elongate member has a protruding member integrally coupled thereto. The protruding member is located on the top side and positioned generally adjacent to the second end. The protruding member has a top surface having a well extending therein. The bottom side of the elongate member has a hole therein. The hole extends into the well. A fastening means fastens the elongate member to the mirror of a semi-truck. A light is elongate and has a first end and a second end. The first end is removably mounted in the protruding member. The light is operationally coupled to a power supply.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new light mounting assembly apparatus and method which has many of the advantages of the light mountings mentioned heretofore and many novel features that result in a new light mounting assembly which is not anticipated, rendered obvious, suggested, or even implied by any of the prior art light mountings, either alone or in any combination thereof.

It is another object of the present invention to provide a new light mounting assembly which may be easily and efficiently manufactured and marketed.

It is a further object of the present invention to provide a new light mounting assembly which is of a durable and reliable construction.

An even further object of the present invention is to provide a new light mounting assembly which is susceptible of a low cost of manufacture with regard to both materials and labor, and which accordingly is then susceptible of low prices of sale to the consuming public, thereby making such light mounting assembly economically available to the buying public.

Still yet another object of the present invention is to provide a new light mounting assembly which provides in the apparatuses and methods of the prior art some of the advantages thereof, while simultaneously overcoming some of the disadvantages normally associated therewith.

Still another object of the present invention is to provide a new light mounting assembly for holding a light on a semi-truck.

Yet another object of the present invention is to provide a new light mounting assembly which includes at least one elongate member. The elongate member has a first end and a second end. The elongate member has a generally planar top and bottom side. The elongate member has an opening therein. The opening is generally adjacent to the first end. The elongate member has a protruding member integrally coupled thereto. The protruding member is located on the top side and positioned generally adjacent to the second end. The protruding member has a top surface having a well extending therein. The bottom side of the elongate member has a hole therein. The hole extends into the well. A fastening means fastens the elongate member to the mirror of a semi-truck. A light is elongate and has a first end and a second end. The first end is removably mounted in the protruding member. The light is operationally coupled to a power supply.

Still yet another object of the present invention is to provide a new light mounting assembly that mounts an elongate light on a mirror of a semi-truck.

Even still another object of the present invention is to provide a new light mounting assembly that is retrofittable to existing semi-trucks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new light mounting assembly according to the present invention.

FIG. 2 is a schematic perspective view of the present invention.

FIG. 3 is a schematic perspective view of the present invention.

FIG. 4 is a schematic side cross-sectional view of the present invention.

FIG. 5 is a schematic front view of the present invention.

DESCRIPTION OF THE PREFERRED EMBODIMENT

With reference now to the drawings, and in particular to FIGS. 1 through 5 thereof, a new light mounting assembly embodying the principles and concepts of the present invention and generally designated by the reference numeral 10 will be described.

As best illustrated in FIGS. 1 through 5, the light mounting assembly 10 generally comprises at least one first elongate member 12. The first elongate member 12 has a first end 14 and a second end 16. The first elongate member 12 has a generally planar top 18 and bottom side 20. The first elongate member 12 has an opening 22 therein. The opening 22 is generally adjacent to the first end 14. The first elongate member 12 has a protruding member 24 integrally coupled thereto. The protruding member 24 is located on the top side 18 and positioned generally adjacent to the second end 16. The protruding member 24 has a top surface 26 having a well 28 extending therein. The bottom side 20 of the first elongate member 12 has a hole 30 therein. The hole 30 extends into the well 28.

The invention preferably includes at least one second elongate member 32. The second elongate member has a first end 14 and a second end 16. The second elongate member has a generally planar top 18 and bottom side 20. The second elongate member has an opening therein 22. The opening 22 is generally adjacent to the first end 14. The second elongate member 32 has a protruding member 24 integrally coupled thereto. The protruding member 24 is located on the top side 18 and positioned generally adjacent to the second end 16. The protruding member 24 has a top surface 26 having a well 28 extending therein. The bottom side 16 of the second elongate member has a hole 30 therein. The hole 30 extends into the well 28. The second elongate member 32 has a bend 34 therein. The bend 34 is positioned generally between the first 14 and second 16 ends such that the first end 14 of the second elongate 32 member extends in an opposite direction of the protruding member 24.

A plurality of fastening means 36 fastening the first 12 and second 32 elongate members to a semi-truck 70. Each of the fastening means 36 extends through the hole 22 in the elongate members 12, 32. Each of the fastening means 36 securely fastens one of the first elongate members 12 to a mirror 72. Also, each of the fastening means 36 securely fastens one of the second elongate members 32 to the body 74 of the semi-truck 70. Each of the fastening means 36 preferably comprises a bolt.

Each of a plurality of lights 38 is elongate and has a first end 40 and a second end 42. Each of the first ends 40 is removably mounted in one of the protruding members 24. Each of the first ends 40 has an annular channel 44 therein such that the protruding 24 member may extend into the channel 44. Each of the lights 38 is operationally coupled to a power supply 46 which extends through the holes.

In use, the user may place as many of the devices 10 on the semi-truck 70 as they desire. Generally, only one will be placed on the top of each mirror 72. The first elongate member 12 is coupled to the top of a mirror 72 so that the light 38 may be placed in the protruding member 24 as shown in FIG. 5. The second elongate member 32 may be coupled to the body 74 of the semi-truck 70. The power supply 46 is placed through the holes 30 and operationally coupled to the lights 38. The placement of the lights 38 away from the front of the semi-truck 70 reduces the vibration on the lights 38 and helps the lights to last longer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light assembly for securely attaching elongated lights to the mirrors of a semi-truck, said assembly comprising:

at least one elongate member, said elongate member having a first end and a second end, said elongate member having a generally planar top and bottom side, said elongate member having an opening therein, said opening being generally adjacent to said first end, said elongate member having a protruding member integrally coupled thereto, said protruding member being located on said top side and positioned generally adjacent to said second end, said protruding member having a top surface having a well extending therein, said bottom side of said elongate member having a hole therein, said hole extending into said well;

a fastening means for fastening said elongate member to the mirror of the semi-truck; and a light, said light being elongate and having a first end and a second end, said first end being removably mounted in said protruding member, said light being operationally coupled to a power supply.

2. The light assembly as in claim 1, wherein said fastening means comprises:

said fastening means extending through said hole, wherein said fastening means securely fastens one of said first elongate members to the mirror, said fastening means comprising a bolt.

3. A light assembly for securely attaching elongated lights to the body of a semi-truck, said assembly comprising:

an elongate member, said elongate member having a first end and a second end, said elongate member having a generally planar top and bottom side, said member having an opening therein, said opening being generally adjacent to said first end, said elongate member having a protruding member integrally coupled thereto, said protruding member being located on said top side and positioned generally adjacent to said second end, said protruding member having a top surface having a well extending therein, said bottom side of said elongate member having a hole therein, said hole extending into said well, said elongate member having a bend therein, said bend being positioned generally between said first and second ends such that said first end of said second elongate member extends in an opposite direction of said protruding member;

a fastening means for fastening said elongate member to said semi-truck; and a lights, said light being elongate and having a first end and a second end, said first end being removably mounted in one of said protruding members.

4. The light assembly as in claim 3, wherein said fastening means comprises:

said fastening means extending through said hole, wherein said fastening means securely fastens said elongate members to the body of the semi-truck, said fastening means comprising a bolt.

5. A light assembly for securely attaching elongated lights to the body and the mirrors of a semi-truck, said assembly comprising:

at least one first elongate member, said first elongate member having a first end and a second end, said first elongate member having a generally planar top and bottom side, said elongate member having an opening therein, said opening being generally adjacent to said first end, said first elongate member having a protruding member integrally coupled thereto, said protruding member being located on said top side and positioned generally adjacent to said second end, said protruding member having a top surface having a well extending therein, said bottom side of said first elongate member having a hole therein, said hole extending into said well;

at least one second elongate member, said second elongate member having a first end and a second end, said second elongate member having a generally planar top and bottom side, said second elongate member having an opening therein, said opening being generally adjacent to said first end, said second elongate member having a protruding member integrally coupled thereto, said protruding member being located on said top side and positioned generally adjacent to said second end, said protruding member having a top surface having a well extending therein, said bottom side of said second elongate member having a hole therein, said hole extending into said well, said second elongate member having a bend therein, said bend being positioned generally between said first and second ends such that said first end of said second elongate member extends in an opposite direction of said protruding member;

a plurality of fastening means for fastening said first and second elongate members to said semi-truck, each of said fastening means extending through said hole, wherein each of said fastening means securely fastens one of said first elongate members to the mirror and wherein each of said fastening means securely fastens one of said second elongate member to the body of the semi-truck, each of said fastening means comprising a bolt; and a plurality of lights, each of said lights being elongate and having a first end and a second end, each of said first ends being removably mounted in one of said protruding members, each of said first ends having an annular channel therein such that said protruding member may extend into said channel, each of said lights being operationally coupled to a power supply extending through said holes.

* * * * *